United States Patent [19]

Quentin

[11] 4,067,803

[45] Jan. 10, 1978

[54] DIALYSIS

[75] Inventor: Jean Pierre Quentin, Lyon, France

[73] Assignee: Rhone Poulenc Industries, Paris, France

[21] Appl. No.: 582,799

[22] Filed: June 2, 1975

[30] Foreign Application Priority Data

June 4, 1974  France .................................. 74.19166

[51] Int. Cl.$^2$ ...................... B01D 31/00; B01D 13/00
[52] U.S. Cl. .............................. 210/22 C; 210/500 M
[58] Field of Search .......... 210/22, 23, 321 K, 500 M; 260/2.2 R, 2.1 R; 204/296

[56] References Cited

U.S. PATENT DOCUMENTS

| | | | |
|---|---|---|---|
| 3,730,872 | 5/1973 | Marze ............................. | 204/296 X |
| 3,795,635 | 3/1974 | Marze et al. ...................... | 204/296 X |
| 3,839,200 | 10/1974 | Glgou et al. ........................ | 210/22 |
| 3,876,565 | 4/1975 | Takashima et al. ........... | 260/2.2 R X |

*Primary Examiner*—Frank A. Spear, Jr.
*Attorney, Agent, or Firm*—Stevens, Davis, Miller & Mosher

[57] ABSTRACT

Membranes which are particularly suitable for use in selective dialysis are described. These comprise:

a. an anion exchange polymer in the form of particles of diameter from 5 to 500 $\mu$;

b. a cation exchange polymer in the form of particles of diameter from 5 to 500 $\mu$; and c. a non-ionic film-forming polymer binder, the percentage by weight of binder not exceeding 50%, the polymers (a), (b) and (c) being insoluble in water, and the anion exchange and cation exchange polymers (a) and (b) being insoluble in at least one solvent for polymer (c), and each polymer having an ionic conductivity $\lambda$ and a permeability U to non-electrolytes such that $\lambda/U > 20$.

4 Claims, No Drawings

DIALYSIS

The present invention relates to dialysis, in particular selective dialysis.

In general terms, dialysis is a technique which consists of allowing ionic or non-ionic species to migrate through a semi-permeable membrane which separates two solutions having different concentrations with regard to the migrating ionic or non-ionic species. The origin of the force causing the migration of the species is therefore, in the case of dialysis, a concentration gradient.

In dialysis, the two solutions between which migration of the species occurs can be immobile, but more frequently these solutions are in motion; they are thus able to circulate.

Selective dialysis to which this invention particularly relates is a dialysis technique such as described above but possessing the particular feature that the migrating (or dialysing) species migrate at different speeds; more precisely the non-ionic migrating species migrate at a different speed from the ionic species (the comparison being made, of course, between non-ionic and ionic species of the same order of size).

It is an object of the present invention to provide membranes which have good selectivity, that is to say a high ratio of the permeability to electrolytes, on the one hand, to the permeability to non-electrolytes, on the other. It has been found, according to the present invention, that it is possible to use, in dialysis, especially in selective dialysis, semi-permeable membranes which comprise a. an anion exchange polymer in the form of particles of diameter from 5 to 500 $\mu$;

b. a cation exchange polymer in the form of particles of diameter from 5 to 500 $\mu$; and c. a non-ionic film-forming polymer (hereafter referred to as the binder), the percentage by weight of binder not exceeding 50%, preferably being from 10 to 30%, the polymers (a), (b) and (c) all being insoluble in water, and the anion exchange and cation exchange polymers being insoluble in at least one solvent for the binder polymer, and each having an ionic conductivity $\lambda$ and a permeability U to non-electrolytes such that $\lambda/U > 20$.

The two ion exchange polymers are preferably used in equal amounts by weight, but it is also possible to have an excess of one, for example up to twice the amount (by weight) of the other.

The ionic conductivity $\lambda$ is equal to $1/R_s$ with $R_s$ representing the substitution resistance, in $\Omega cm^2$, of a 40$\mu$ thick membrane consisting of the polymer in question.

The substitution resistance for a given area of membrane is the change in electrical resistance of a liquid cylinder if the membrane is substituted for a slice of liquid of the same thickness and the same surface area as the membrane, in a position at right angles to the axis of the cylinder. In the present case, this substitution resistance is measured at 25° C., in an 0.6 M aqueous KCl solution and is expressed in $\Omega.cm^2$.

The permeability, U, to non-electrolytes is expressed in cm/minute and can be calculated from the equation:

$$U = \frac{V(C_T - C_{T+\Delta T})(\log_{10}\Delta C_T - \log_{10}\Delta C_{T+\Delta T})}{2.3 \, S \cdot \Delta T (\Delta C_T - \Delta C_{T+\Delta T})}$$

in which:

U is expressed in cm/minute;

V is the volume of each compartment of the dialyser, in $cm^3$;

S is the useful area of the membrane, in $cm^2$;

$\Delta T$ is the period of time over which the measurement is made;

$C_T$ and $C_{T+\Delta T}$ are the concentrations (in mol/cm$^3$) at times T and T + $\Delta T$ in the compartment in which the measurement is made; and $\Delta C_T$ or $\Delta C_{T+\Delta T}$ is the difference in concentration between the two compartments of the dialyser at time T or T + $\Delta T$.

The measurement is made at ambient temperature and is virtually independent of the chosen value of $\Delta T$.

The use of the invention in selective dialysis may be considered as a dialysis process which can especially be used for fractionation or for purification or for enrichment or for separation or for exchange; such a dialysis process can, in particular, permit the preferential transfer of ionic species, relative to non-ionic species, from a solution located on one side of the membrane to a second solution located on the other side of the membrane. The (one or more) non-ionic species which can be preferentially retained in the selective dialysis is typically urea but it can also be any other known species, for example the sugars (glucose) and the aminoacids at their isoelectric point. In the process of the present invention, as in all dialysis processes, the migrating species migrate from the more concentrated compartment to the less concentrated compartment; where preferential migration of ionic species relative to non-ionic species occurs, one is dealing with a dialysis in which one and the same compartment of the dialysis apparatus has a higher concentration of both ionic species and non-ionic species than the other compartment. Thus, the invention can be considered as a process for the fractionation of a mixture of ionic species and non-ionic species, which consists of carrying out a dialysis between a solution containing the mixture of compounds to be fractionated and another solution where these compounds are present at zero concentration (at least initially) or at a concentration less than the concentration of the first solution. The ionic and non-ionic species with which the present invention is particularly concerned are especially inorganic salts, sugars, above all carbohydrates, aminoacids and urea. The solutions subjected to fractionation are preferably aqueous solutions in which the said species are present at a concentration of from 0.1% by weight up to the saturation weight percentage. The second solution, wherein the ionic and non-ionic species are present at zero concentration or at a concentration less than that of the first solution is also preferably an aqueous solution; the latter may initially be water; of course during the operations this water becomes charged with solutes which have undergone dialysis.

As anion exchange polymers (a) which can be used in the present invention there may be mentioned quaternised phenoxy resins such as those described in U.S. Pat. No. 3,751,376, produced by alkaline condensation of a bisphenol with epichlorohydrin, followed by a condensation with epichlorohydrin in the presence of a Lewis acid, and then by a quaternising amination by means of a tertiary amine, and copolymers of acrylonitrile and vinylpyridines or alkylvinylpyridines or dialkylaminoalkyl methacrylate, wherein these comonomers are quaternised and optionally crosslinked by means of monofunctional or bifunctional quaternising agents (see, for example, British Specification No. 1,316,530).

As cation exchange polymers (b) which can be used in the present invention there may be mentioned the polyaryl ethers/sulphonated sulphones (see, for example, U.S. Pat. No. 3,709,841), and the sulphated copolymers of ethylene and vinyl alcohol possessing sulphonic acid groups (or sulphonate salt groups).

In particular in the membranes the cation exchange polymer is a sulphated ethylene-vinyl alcohol copolymer or a sulphonated polyaryl ether sulphone and the anion exchange polymer is a quaternised phenoxy resin.

As binder polymers (c) there may be mentioned purely hydrocarbon thermoplastic polymers, particularly the polyolefines, especially the homopolymers and copolymers of styrene, isoprene, ethylene, propylene and butene, and the ethylene-vinyl alcohol copolymers.

An advantageous process for the preparation of membranes according to this invention consists of producing a suspension using a solvent for the binder polymer (c), the latter being in solution whilst the ion exchange polymers are in the form of suspended particles of the specified size; when this suspension has been produced, it is cast on a carrier which has the shape desired for the membrane e.g. planar, cylindrical or conical and the solvent is evaporated. The solvent should be used in such amount that in the suspension the binder is present at a concentration from 5% by weight to the saturation concentration. The casting support may be of any type; most frequently, a metal carrier or a carrier of a polymeric material is used. Of course, the membrane is detached from the carrier after the solvent has evaporated.

The membranes thus obtained can be improved, especially with regard to their cohesion, by hot-pressing, if appropriate in the presence of a solvent. Pressing carried out at 10 to 100 bars, at 70° to 160° C., is generally suitable.

The selective dialysis is particularly valuable when applied to the demineralisation of sugar syrups and the purification of aminoacids.

The following Examples further illustrate the present invention.

EXAMPLE 1

A suspension is prepared which consists of:

α. 15 cm³ of a 2% by weight solution of an ethylene-vinyl alcohol copolymer in xylene (molar ratio of ethylene to hydroxyethylene units = 9.2). This copolymer, when subjected to total acetylation, has a melt index of 2, measured according to Standard Specification ASTM D 1238-52 T.

β. 1.165 g. of particles of quaternised phenoxy resin, having a diameter of between 100 and 160 μ. This resin is produced from a polycondensate of epichlorohydrin and 2,2-bis-(hydroxyphenyl)-propane, having a reduced viscosity of 36 cm³/g measured on a solution of 2 g/l strength in dimethylformamide at 25° C. This polycondensate is then treated with epichlorohydrin in the presence of $BF_3$, after which it is aminated and quaternised by means of trimethylamino. An anion exchange polymer containing 1.4 milliequivalents per gram of dry resin (meq/g) is obtained.

$$\lambda = 1.43 \Omega^{-1}.cm^{-2}$$

$$U = 5 \times 10^{-3} cm/mn$$

$$\lambda/U = 286$$

γ. 0.835 g. of sulphated ethylene-vinyl alcohol copolymer particles of diameter between 100 and 160 μ. This copolymer, which contains 2.8 meq/g of sulphate groups, was obtained from an ethylene-vinyl alcohol copolymer wherein the ratio of the number of ethylene units to hydroxyethylene units is 9.2 and which, when subjected to total acetylation, has a melt index of 2.

$$\lambda = 0.154 \Omega^{-1}.cm^{-2}$$

$$U = 5 \times 10^{-3} cm/mn$$

$$\lambda/U = 30.8$$

The suspension is cast on a cellulose film so as to form a liquid film 300 μ thick, which is dried at 50° C., for 15 hours under reduced pressure (to 100 mm.Hg).

The combination of membrane + cellulose film is pressed at 120° C., under 40 bars, cooled and immersed for 1 minute in dimethylformamide.

This membrane is used in a dialyser with two compartments, one of which contains pure water and the other contains an aqueous solution containing 0.1 mol of sodium chloride/¹ and 0.1 mol of alanine/¹; the concentration is kept constant in each compartment by stirring.

The permeability coefficients U are determined from the equation given earlier.

The permeability coefficient for NaCl is $21 \times 10^{-4}$ cm/mn and that for alanine is $1.5 \times 10^{-5}$ cm/mn, representing a dialysis selectivity of salt/aminoacid = 140.

EXAMPLE 2

Example 1 is repeated, but using a sulphonated polyaryl ether sulphone as the cation exchange polymer (defined under γ). The polymer is obtained as described in the U.S. Pat. No. 3,709,841, but modifying the sulphonation conditions so as to obtain a sulphonic acid group content equal to 0.95 meq/g.

The membrane finally obtained has a salt/urea dialysis selectivity of 2.5 and a salt/glucose dialysis selectivity of 10.

I claim:

1. In a process for the fractionation of a mixture of an ionic species and a non-ionic species which consists of dialysing the mixture through a dialysis membrane with another solution where these species are present in zero concentration or at a lower concentration than in the mixture, the improvement wherein the dialysis membrane comprises:
   a. an anion exchange polymer in the form of particles of diameter from about 5 to about 500 μ;
   b. a cation exchange polymer in the form of particles of diameter from about 5 to about 500 μ; and
   c. a non-ionic film-forming polymer binder, the percentage by weight of binder not exceeding 50%, the polymers (a), (b) and (c) being insoluble in water, the anion exchange and cation exchange polymers (a) and (b) being insoluble in at least one solvent for polymer (c), and each polymer having an ionic conductivity λ and a permeability U to non-electrolytes such that λ/U > 20, and the amounts of polymers (a) and (b) being such that the weight of one is at most equal to twice the weight of the other, said membrane being such as to allow ionic species to pass through preferentially in relation to non-ionic species.

2. Process according to claim 1, in which the mixture and solution are aqueous.

3. Process according to claim 1, in which the ionic and non-ionic species are selected from the group consisting of mineral salts, sugars, aminoacids and urea.

4. Process according to claim 1, in which the species to be fractionated are present at a concentration from 0.1% by weight to the saturation weight percentage.

* * * * *